J. E. BUXTON & T. J. HOWE.
Harvester-Rakes.
No. 147,477.              Patented Feb. 17, 1874.
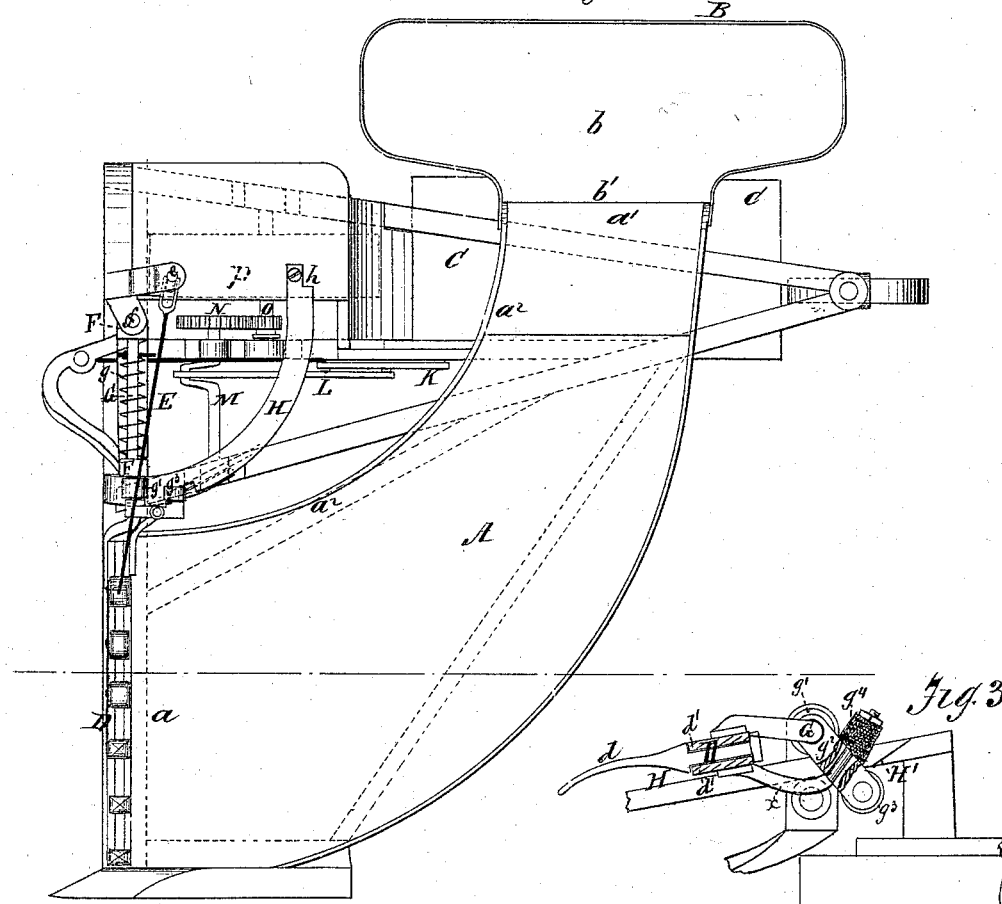
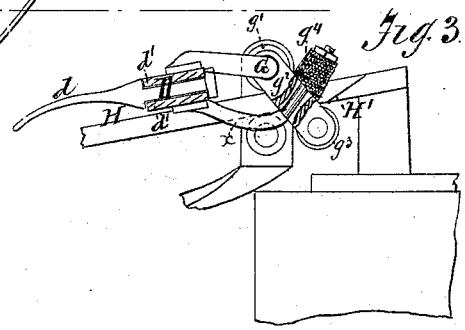
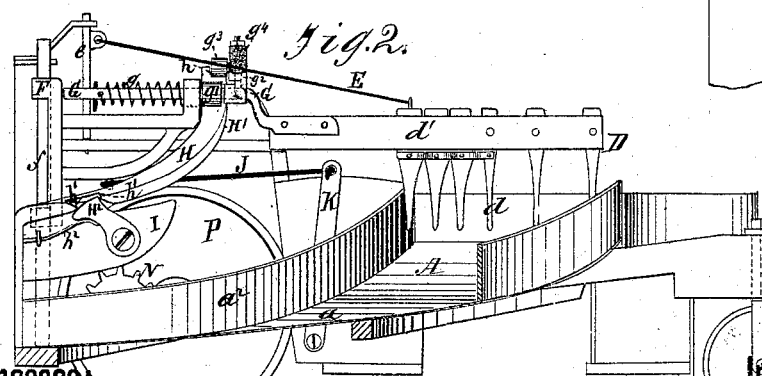
Witnesses:                Inventor:
G. Mathys.                John E. Buxton
C. A. Pettit.             Thomas J. Howe
                          Per
                          Attorneys.

UNITED STATES PATENT OFFICE.

JOHN E. BUXTON AND THOMAS J. HOWE, OF OWATONNA, MINNESOTA.

IMPROVEMENT IN HARVESTER-RAKES.

Specification forming part of Letters Patent No. 147,477, dated February 17, 1874; application filed September 26, 1873.

*To all whom it may concern:*

Be it known that we, JOHN E. BUXTON and THOMAS J. HOWE, of Owatonna, in the county of Steele and State of Minnesota, have invented a new and Improved Harvester-Rake; and we do hereby declare that the following is a full, clear, and exact description of the same, reference being had to the accompanying drawing, forming a part of this specification, in which—

Figure 1 is a top view. Fig. 2 is a longitudinal vertical section. Fig. 3 is a detail view.

The invention relates to that class of rakes used upon grain-harvesters, for the purpose of automatically raking the grain off the platform, transferring it to the rear end on a binding-platform, and distributing it in gavels of a size suitable to be tied and handled with facility.

A represents the harvester-platform, on whose front, $a$, the straw and grain fall, and at whose rear it is delivered on another connected platform, B. The latter has a middle, $b$, which receives gavel, two projecting sides, to one of which a gavel is alternately drawn by the two binders, and a neck, $b'$, on each side of which is located a binders' stand, C. This arrangement of these parts enables each binder to have easy access to the bundle in center, and yet to be unimpeded by it while he is tying a preceding one. The platform A is curved on a gradual rise, so that the grain will tend to fall against the rake in a bundle, while it is gradually decreased in width as it approaches the binding-platform, so that the butts will be pressed and made to become even with each other. Thus the binders are relieved of all labor in arranging the parts of a gavel, and can bind much more rapidly as well as thoroughly. D is a vibratory harvester-rake, which must be expansible and contractible to suit the varying shape of platform. For this purpose more or less of the teeth $d$ are flexibly connected, the inner end one being provided with a rod, E, which is made fast at its rear end to a rock-shaft, $e$, while more or less of the teeth are made thus to move between bars $d'$ $d'$. As the rake rises, and as the rear side $a^2$ of the platform becomes at a greater and greater distance from the center of motion, the rod E pushes out the inner-end tooth more and more, this continuing until the delivery end $a^1$ is reached. The rake is connected with the pintle $f$ by a reciprocating hinge, F, and a rocking shank, G, the shank being journaled in the hinge, and being provided with a spiral spring, $g$, which exercises a constant tension, and tends to turn it toward the rear. On this shank G is a friction-roll, $g^1$, and an arm, $g^2$, which is also provided with a friction-roll, $g^3$. When the rake moves up, it is gradually raised by the correspondingly-rising track H, on which rests the friction-rolls $g^1$ $g^3$, the latter roll being held thereto by the spring. This has the effect of regulating the position of the rake and its teeth. At the top of the track H is a recess, $h$, and thereunder a second track, $H^1$, against which bears the friction-roll $g^3$ on its return. The two tracks meet at a sharp angle just at the recess $h$. When the friction-roll $g^3$ reaches the notch $h$, the tension of spring $g$ upon arm $g^2$ causes the shank G to turn, and the rake-teeth to be lifted off the platform A, while the bearing of roll $g^3$ against the subjacent track $H^1$ prevents the rake from changing its position until it reaches the notch $h^1$. $H^2$ is an auxiliary track pivoted on a projection, I, having its upper edge arranged in the recess $h^1$, and supported on a spring, $h^2$, that is more powerful than spring $g$, so that it will not yield to the pressure of roll $g^3$ in passing over its top. When, however, the roll $g^3$ is brought against its edge $i$ by the backward oscillation of the hinge, it is compelled to yield until the roll has come under the recess $h^1$, the roll being then forced up and caused to take its position on the track $H^2$. The rake is then ready to make another sweep round, collect the straw, butt the ends evenly, and transfer the gavel to the binders' platform. The spring $g$ also assists the rake-teeth in extricating themselves from a large bundle. In order to vibrate the hinge F backward and forward, and thus move the rake, we attach the pitman J to the upper end of a bar, K, that is pivoted at the lower end to frame, and oscillated by a rod, L, crank M, gear N O, and large wheel P. The teeth $d$ are curved rearwardly, as shown in the drawing, to conform to the motion of the rake when coming down to the platform, and also for helping to relieve it from the bundle when it is raised. A small rubber spring, $g^4$, is arranged on the brace-rod $x$, which passes through arm $g^2$, between said arm and the nut on the brace-rod that connects with the rake-head. When the rake goes down for a bundle, this spring allows the teeth to yield upwardly, and thus to go only partially through the bundle. This also relieves the strain on the parts as the roll $g^3$ goes up through the aperture $h^1$.

If all the gavels could be of the same size, there would be no necessity for this spring; but, as that cannot be, owing to the difference in the stand or number of straws on the same area in various portions of a field, some provision is necessary to secure a yielding pressure.

Having thus described our invention, what we claim as new, and desire to secure by Letters Patent, is—

1. The rubber spring $g^4$, brace-rod $x$, and arm $g^2$, combined with rake-head, as and for the purpose specified.

2. A harvester-rake having teeth flexibly connected and alternately contracted and expanded by a push-rod, E, as and for the purpose specified.

3. A rake-shank, G, journaled in a rising hinge, F, and provided with spring $g$, roll $g^1$, arm $g^2$, and roll $g^3$, in combination with a rising track, H, as and for the purpose described.

4. The two tracks H H$^1$, having a junction at the notches $h\ h^1$, combined with the spring-supported auxiliary track H$^2$, and the pivoted rake-shank G, having the spring-vibrated arm $g^2$, as and for the purpose set forth.

JOHN E. BUXTON.
THOMAS J. HOWE.

Witnesses to both signatures:
LEWIS L. WHEELOCK,
WESLEY A. SPERRY.